(12) United States Patent
Glukhovskyi et al.

(10) Patent No.: US 9,487,442 B1
(45) Date of Patent: Nov. 8, 2016

(54) RAW MIXTURE AND METHOD FOR PRODUCING GAS CONCRETE

(71) Applicant: Mongoose Pictures Limited, Nicosia (CY)

(72) Inventors: Vladyslav Glukhovskyi, Kyiv (UA); Igor Glukhovskyi, Kyiv (UA)

(73) Assignee: Mongoose Pictures Limited, Nicosia (CY)

( * ) Notice: Subject to any disclaimer, the term of this patent is extended or adjusted under 35 U.S.C. 154(b) by 0 days.

(21) Appl. No.: 15/014,351

(22) Filed: Feb. 3, 2016

(30) Foreign Application Priority Data

Dec. 17, 2015 (UA) .................................. 201512488

(51) Int. Cl.
*C04B 7/153* (2006.01)
(52) U.S. Cl.
CPC .................................. *C04B 7/1535* (2013.01)
(58) Field of Classification Search
CPC . C04B 7/1535; C04B 18/141; C04B 18/142; C04B 28/02; C04B 28/082
See application file for complete search history.

(56) References Cited

U.S. PATENT DOCUMENTS

| 3,784,385 A * | 1/1974 | Nekrasov | C04B 18/144 |
| | | | 106/602 |
| 4,221,598 A * | 9/1980 | Doblinger | C04B 28/18 |
| | | | 106/641 |
| 9,090,508 B2 * | 7/2015 | Gong | C04B 28/006 |

FOREIGN PATENT DOCUMENTS

| EP | 2875924 A1 * | 5/2015 |
| SU | 1763427 A1 * | 9/1992 |
| WO | WO 2015/020612 A1 * | 2/2015 |

OTHER PUBLICATIONS

Derwent-Acc-No. 2013-D03941, abstract of Chinese Patent Specification No. CN 102795883 A (Nov. 2012).*
Derwent-Acc-No. 2010-Q57153, abstract of Korean Patent Specification No. KR 20100128678 (Dec. 2010).*
Derwent-Acc-No. 2014-W86463, abstract of Korean Patent Specification No. KR 2014141996 (Dec. 2014).*
Bagrov B.O. "Production of Heat-Insulating Material from Non-Ferrous Metallurgy Wastes"; Moscow, Metallurgy Publishing House, 1985, p. 64 (9 pages).
Krivenko P.V. et al. "Slag-alkaline Gaseous Concretes Based on Siliconmanganese Slag"; Slag-alkaline Cements, Concretes and Constructions. Reports and Theses of Reports of the 3rd All-Union Scientific and Practical Conference. Kyiv, Kyiv Engineering and Building Institute (KEBI), 1989, vol. II. 118pp (7 pages).

* cited by examiner

Primary Examiner — Anthony J Green
(74) *Attorney, Agent, or Firm* — Osha-Liang LLP

(57) ABSTRACT

The invention relates to the field of construction materials and can be used in manufacture of heat-insulating, structural and heat-insulating, as well as structural gas concretes and articles based thereon to be used in construction of outer and inner walls of residential, public and industrial buildings.

The raw mixture for manufacture of gas concrete comprises ground granulated blast furnace slag, sodium hydroxide, sodium silicate solution, aluminum powder as a gas-forming agent, and additionally comprises a product of condensation of sulfonated naphthalene with formaldehyde at the following component proportion, % by weight:

| Ground granulated blast furnace slag | 63.0-69.0 |
| Sodium silicate solution | 36.7-30.6 |
| Aluminum powder | 0.07-0.11 |
| Product of condensation of sulfonated naphthalene with formaldehyde | 0.11-0.13 |
| Sodium hydroxide | 0.12-0.16 |

3 Claims, No Drawings

RAW MIXTURE AND METHOD FOR PRODUCING GAS CONCRETE

The invention relates to a field of construction materials and can be used in manufacture of heat-insulating, structural and heat-insulating, and structural gas concretes and products based thereon to be used in construction of outer and inner walls of residential, public and industrial buildings.

Compositions of heat-insulating materials with cellular structure based on granulated nonferrous slags [1] are known in the art.

A raw mixture for producing gas concrete which comprises a slag component, water-glass, a component containing calcium and aluminum powder, wherein granulated ground silicomanganese slag is used as a slag component, and a mixture of calcium oxide and calcium nitrate in the ratio of (1-10):1 is used as a calcium-containing component is known in the art [2].

Drawbacks of such mixtures, where ground nonferrous slag is used as a cementing component are slower gaining a plastic strength by the concrete body and lower compressive strength of finished products, which dictates the need for their high-temperature autoclave treatment.

Another prior art composition of the raw mixture for producing gas concrete [3] comprises the following components, % by weight:

| | |
|---|---|
| Ground granulated slag | 80-87; |
| Sodium hydroxide | 3-5; |
| Wastes of ferrosilicon production | 2-3; |
| Kaolin | 8-12. |

In manufacturing of the mixture were used the following components: ground granulated blast furnace slag with specific surface area of 350-450 m²/kg, sodium hydroxide as a solution with density of 1300 kg/m³, wastes of ferrosilicon production with specific surface area of 400-600 m²/kg and having the following composition, % by weight: Si: 60 . . . 75; Fe: 20 . . . 30; Al: 2.0 . . . 3.0; CaO: 0.1 . . . 0.5; C: 0.1 . . . 0.2; Mg: 0.05, and concentrated kaolin with specific surface of 250-350 m²/kg.

Drawbacks of such mixture are slower gaining a plastic strength by the concrete body, low compressive strength and strength-to-weight ratio, which dictates the need for steam curing of products made of this mixture in order to increase their compressive strength.

The closest prior art to the proposed mixture is a mixture [4] for producing gas concrete, which comprises ground granulated blast furnace slag, sodium hydroxide and gas-forming agent, and which, according to the invention, additionally contains a sodium silicate solution, and aluminum powder as a gas-forming agent, with the following component proportions, % by weight:

| | |
|---|---|
| Ground slag | 61.90-70.94 |
| Sodium hydroxide | 6.00-8.00 |
| Sodium silicate solution | 23.00-30.00 |
| Aluminum powder | 0.06-0.10 |

In particular, ground granulated blast furnace slag manufactured by Public Joint-Stock Company "Zaporizhstal" (Zaporizhia Metallurgic Plant, Zaporizhia, Ukraine) with specific surface of 300 m²/kg, sodium hydroxide (Closed Joint-Stock Company "Ukrainsky Sylikat", Kherson, Ukraine) as a solution with density of 1,300 kg/m³, a solution of sodium water glass (Closed Joint-Stock Company "Ukrainskyi Sylikat", Kherson, Ukraine) with density of 1,400 kg/m³, and aluminum powder PAP-1 (ПАП-1) manufactured by Open Joint-Stock Company "Kamensk-Uralsky Non-Ferrous Processing Plant" (Kamensk-Uralsky, Russian Federation) are used for manufacture of the mixture.

Drawbacks of the above mixture relate to relatively low compressive strength and strength-to-weight ratio. This is due to uneven pore size distribution, which is evidenced by the presence of up to 30% large pores in the bulk of mature gas concrete, with a maximum diameter of 3 to 5 mm, that are characterized by the absence of a regular spherical shape, as well as by the presence of breaks in interpore partitions.

The above drawback is a result of the mixture preparation method, wherein dry components of said mixture (ground granulated blast furnace slag and aluminum powder) were stirred for 2 minutes, then sodium silicate solution was added and further stirred for 2 minutes, and 0.5 minutes before the end of stirring a sodium hydroxide solution was added to the mixture. The described method of entering aluminum powder, whose particles are aggregated and coated with a paraffin film, does not allow to perform a uniform distribution of gas-forming agent particles under dry mixing, and addition of components of sodium silicate aqueous solution to a dry mixture results in floatation of certain amount of aluminum powder particles to the surface of the mixture.

The aim of the present invention is to improve the production method and composition of the raw mixture for production of gas concrete, wherein, in consequence of introduction of an additional component and changing the order of preparation of the mixture, uniform distribution of gas-forming agent particles throughout the raw mixture volume during its preparation and dispersion of aggregated gas-forming agent particles are provided.

The above aim is solved by the present invention in that the raw mixture for producing gas concrete, which comprises ground granulated blast furnace slag, sodium hydroxide, sodium silicate solution, aluminum powder as a gas-forming agent in accordance with the present invention further comprises a product of condensation of sulfonated naphthalene with formaldehyde in the following proportion of the components, % by weight:

| | |
|---|---|
| Ground granulated blast furnace slag | 63.0-69.0 |
| Sodium silicate solution | 36.7-30.6 |
| Aluminum powder | 0.07-0.11 |
| Product of condensation of sulfonated naphthalene with formaldehyde | 0.11-0.13 |
| Sodium hydroxide | 0.12-0.16 |

The object of the invention is also a method for obtaining gas concrete using the claimed raw mixture, which comprises mixing ground granulated blast furnace slag, sodium silicate solution, aluminum powder as a gas-forming agent and sodium hydroxide, loading into a casting box, blowing out and hardening, opening the casting box and transferring to a cutting station, wherein, according to the invention, aluminum powder is introduced into the mixture composition as a suspension of aluminum powder in aqueous solution of the product of condensation of sulfonated naphthalene with formaldehyde, after mixing the ground blast furnace slag with a solution of sodium silicate and prior to introduction of sodium hydroxide into the mixture composition.

Moreover, the products formed of gas concrete after completion of the processes of blowing out and hardening, are subjected to hydrothermal treatment in an autoclave at temperature of 170-190° C. and pressure of 0.8-1.3 MPa.

Aluminum powder is introduced into the composition of a mixture as a preformulated suspension of aluminum powder in the solution of the product of condensation of sulfonated naphthalene with formaldehyde in water, in the following sequence:

ground granulated blast furnace slag is mixed with a solution of water-glass;

the mixture is admixed with aqueous suspension of aluminum powder in the solution of the product of condensation of sulfonated naphthalene with formaldehyde;

the mixture is admixed with sodium hydroxide solution.

The mixture made according to the above sequence is discharged into a casting box where it is blown out as a result of aluminum powder and sodium hydroxide reaction.

When the process of blowing out has been completed and the mixture has reached a plastic strength level of 50-70 kPa, the casting box is opened and transferred to the cutting station.

After cutting the concrete body products are transferred to the station of normal solidifying or autoclave treatment.

The following materials were used for manufacture of samples of the gas concrete from the mixture and according to the method as proposed:

ground granulated blast furnace slag from Public Joint-Stock Company "Zaporizhstal" (Zaporizhia Metallurgic Plant, Zaporizhia, Ukraine) with specific surface of 300 m$^2$/kg;

sodium silicate solution (Closed Joint-Stock Company "Ukrainskyi Sylikat", Kherson, Ukraine) with density of 1,387 kg/m$^3$;

sodium hydroxide (Closed Joint-Stock Company "Ukrainskyi Sylikat", Kherson, Ukraine) which was used as a solution with density of 1,300 kg/m$^3$;

aluminum powder PAP-1 (ПАП-1) (Open Joint-Stock Company "Kamensk-Uralsky Non -Ferrous Processing Plant" (Kamensk-Uralsky, Russian Federation);

product of condensation of sulfonated naphthalene with formaldehyde (KHP (К ХП) "Dzerzhynsky Phenolic Plant", Dzerzhynsk, Ukraine) which was used as aqueous solution with density of 1,145 kg/m$^3$.

le;2qVariants of mixture compositions for producing gas concrete are listed in Table 1.

TABLE 1

| Component of the mixture | Composition of the mixture, wt.% | | | Prototype | |
|---|---|---|---|---|---|
| | 1 | 2 | 3 | 4 | 5 |
| Ground slag | 63.0 | 66.0 | 69.0 | 61.90 | 70.94 |
| Sodium silicate solution | 36.7 | 33.65 | 30.6 | 30.00 | 23.00 |
| Aluminum powder | 0.07 | 0.09 | 0.11 | 0.10 | 0.06 |
| Product of condensation of sulfonated naphthalene with formaldehyde | 0.11 | 0.12 | 0.13 | — | — |
| Sodium hydroxide | 0.12 | 0.14 | 0.16 | 8.00 | 6.00 |

Manufacture of the mixture according to the variants of composition, as listed in Table 1, was carried out in the following sequence. Ground granulated blast furnace slag was mixed with sodium silicate solution for 2 minutes. The resulting mixture was admixed with a preformulated suspension of aluminum powder in aqueous solution of the product of condensation of sulfonated naphthalene with formaldehyde and stirred for 2 minutes. At the last step sodium hydroxide solution was added, whereafter the mixture was stirred for 1 minute. The prepared mixture was discharged into casting boxes (7×7×7 cm cubes) where it was blown out.

2 hours after completion of the blowing out process casting boxes were opened and the samples were removed from the casting boxes. One portion of the produced samples was placed into a hydroseal, where they were solidified under normal conditions at temperature of 20±5° C. for 3, 7 and 28 days, and the second portion of samples was placed into an autoclave, where they underwent hydrothermal treatment under pressure of 1.8 MPa and attemperature of 178° C.

Plastic strength of gas concrete was determined with resilient plastometer designed by NDPU (НД ПУ) "Sylika-tobeton" every 10 minutes after beginning of stirring. Compressive strength after solidifying of gas-concrete mixture under normal conditions during 3, 7 and 28 days and after autoclave treatment was determined according to results of tests of the control samples on a hydraulic press (Open Joint-Stock Company "Armavir Plant of Testing Machinery", Armavir, Russian Federation). Strength-to-weight ratio was determined according to the following formula: $SWR = R_{comp}/\rho_{cone}$, where $R_{comp}$ is compressive strength of gas concrete, and $\rho_{cone}$ is average density of t gas concrete.

Uniformity of pore size of gas concrete was determined with a use of a reading microscope MPB-2 (МПБ-2) (Joint-Stock Company "ASMA-Prylad", Svitlovodsk, Ukraine).

The results of testing the samples made according to the proposed technical solution, as well as characteristics of the mixture and the gas concrete according to the prototype, are provided in Table 2.

TABLE 2

| Characteristic | Unit | Composition of the proposed mixture | | | Prototype [4] | |
|---|---|---|---|---|---|---|
| | | 1 | 2 | 3 | 4 | 5 |
| Plastic strength after: | | | | | | |
| 20 minutes | kPa | 14 | 17 | 24 | 15 | 21 |
| 30 minutes | kPa | 21 | 27 | 38 | 22 | 37 |
| 60 minutes | kPa | 50 | 58 | 68 | 48 | 65 |
| 90 minutes | kPa | End of hardening of the mixture | | | 73 | 81 |
| Compressive strength at the age of: | | | | | | |
| 3 days | MPa | 3.4 | 3.4 | 3.8 | 2.9 | 3.1 |
| 7 days | MPa | 5.4 | 5.6 | 5.9 | 4.5 | 5.4 |
| 28 days | MPa | 6.5 | 6.9 | 7.9 | 5.5 | 6.8 |
| after autoclaving | MPa | 7.5 | 7.8 | 8.6 | — | — |
| Average density | kg/m³ | 560 | 600 | 610 | 580 | 650 |
| Strength-to-weight ratio: | — | | | | | |
| at the age of 28 days | | 116.1 | 115.0 | 129.5 | 94.8 | 104.6 |
| after autoclaving | | 133.9 | 130.0 | 140.9 | — | — |

Results of determination of pore size uniformity in gas concrete are provided in Table 3.

TABLE 3

| Characteristic | Composition of the proposed mixture | | | Prototype [4] | |
|---|---|---|---|---|---|
| | 1 | 2 | 3 | 4 | 5 |
| Amount of pores with a size of 3-5 mm, % | absent | absent | absent | 27 | 31 |
| Amount of pores with a size of 1-2 mm, % | 78 | 75 | 81 | 71 | 65 |
| Amount of pores with a size of less than 1 mm, % | 22 | 25 | 19 | 2 | 4 |
| Presence of breaks in interpore partitions | absent | absent | absent | present | |

It is evident from the presented data that, in comparison with the known technical solution [4], test samples are characterized by faster development of plastic strength, higher level of compressive strength, while having lower average density of gas concrete and higher strength-to-weight ratio. Furthermore, test samples reach higher values of the above-mentioned properties even without autoclaving, and hydrothermal treatment further improves concrete properties.

The above-mentioned differences of gas concrete made according to the proposed technical solution are attributable to higher pore size uniformity.

Proposed predispersing of aluminum powder in the solution of the product of condensation of sulfonated naphthalene with formaldehyde provides for a cellular structure of the gas concrete, which is characterized by higher pore size uniformity, absence of pores with size over 3 mm and absence of breaks in interpore partitions. Such structure is characterized by pores of the same size, which are evenly distributed throughout the bulk of gas concrete.

New set of essential features of a cellular structure provides for heightening of strength of the final product by 16-18% at the age of 28 days of concrete solidifying under normal conditions and allows to lower consumption of aluminum powder while having lower average density of the final product, which is evidence of higher efficiency of the gas-forming agent. Autoclave treatment of the gas concrete allows to increase its compressive strength by 9-15%.

Provided results indicate that proposed composition of the raw mixture for producing gas concrete and preparation method thereof facilitate intensification of a structure formation process, accelerate the process of development of plastic strength, which reduces duration of the manufacturing procedure and substantially accelerates development of strength by gas concrete.

Thus, the use of proposed mixture will provide for manufacture of structural and heat-insulating material with good stress-strain properties, while substantially shortening the duration of the production cycle.

REFERENCES

1. Багров Б. О. Производство теплоизоляционного материала из отходов цветной металлургии. М.: Металлургия 1985. 64 с. (Bagrov B. O. "Production of Heat-Insulating Material from Non-Ferrous Metallurgy Wastes". Moscow, Metallurgy Publishing House, 1985, p. 64.

2. Кривенко П.В., Старинская Н. Н., Мельник Т. Б. (Krivenko P. V., Starinskaya N. N., Melnik T. B.) Шлакощелочные Газобетоны на основе шлака силикомарганца/Шлакощелочные цементы, бетонь и конструкции. Докл. и тез. докл 3-й Всесоюз, научн.-практ. конф. К: КИСИ, 1989. Т.II.-118 стр. (Krivenko P.V., Starinskaya N. N., Melnik T. B. "Slag-alkaline Gaseous Concretes Based on Silicomanganese Slag.// Slag-alkaline Cements, Concretes and Constructions. Reports and Theses of Reports of the 3$^{rd}$ All-Union Scientific and Practical Conference.-Kyiv, Kyiv Engineering and Building Institute (KEBI), 1989, Vol. II.-118 pp.

3. Declarative Patent of Ukraine for Invention No. 49267A 6 CO4B28/02, 2002.

4. Declarative Patent of Ukraine for Utility Model No. 49058A 6 CO4B28/02, 2009.

The invention claimed is:
1. A raw mixture for producing gas concrete, comprising ground granulated blast furnace slag, sodium hydroxide, sodium silicate solution, aluminum powder as a gas-forming agent, characterized in that it additionally comprises a product of condensation of sulfonated naphthalene with formaldehyde, in the following proportion of the components, % by weight:

| | |
|---|---|
| Ground granulated blast furnace slag | 63.0-69.0 |
| Sodium silicate solution | 30.6-36.7 |
| Aluminum powder | 0.07-0.11 |
| Product of condensation of sulfonated naphthalene with formaldehyde | 0.11-0.13 |
| Sodium hydroxide | 0.12-0.16. |

2. A method for producing gas concrete using the raw mixture according to claim 1, wherein the method comprises mixing ground granulated blast furnace slag, solution of sodium silicate, aluminum powder as a gas-forming agent and sodium hydroxide, loading into a casting box, blowing out and hardening, opening the casting box and transferring to a cutting station, characterized in that the aluminum powder is introduced into the mixture composition as a suspension of aluminum powder in aqueous solution of the product of condensation of sulfonated naphthalene with formaldehyde after mixing of ground blast furnace slag with solution of sodium silicate and prior to introduction of sodium hydroxide to the mixture composition.

3. The method according to claim 2, wherein products formed of the gas concrete, after completion of the processes of blowing out and hardening, are subjected to hydrothermal treatment in an autoclave at temperature of 170-190° C. and pressure of 0.8-1.3 MPa.

* * * * *